Feb. 9, 1954     D. F. SHERMAN     2,668,407
ROTARY BEET TOPPER
Filed May 6, 1952     2 Sheets-Sheet 1
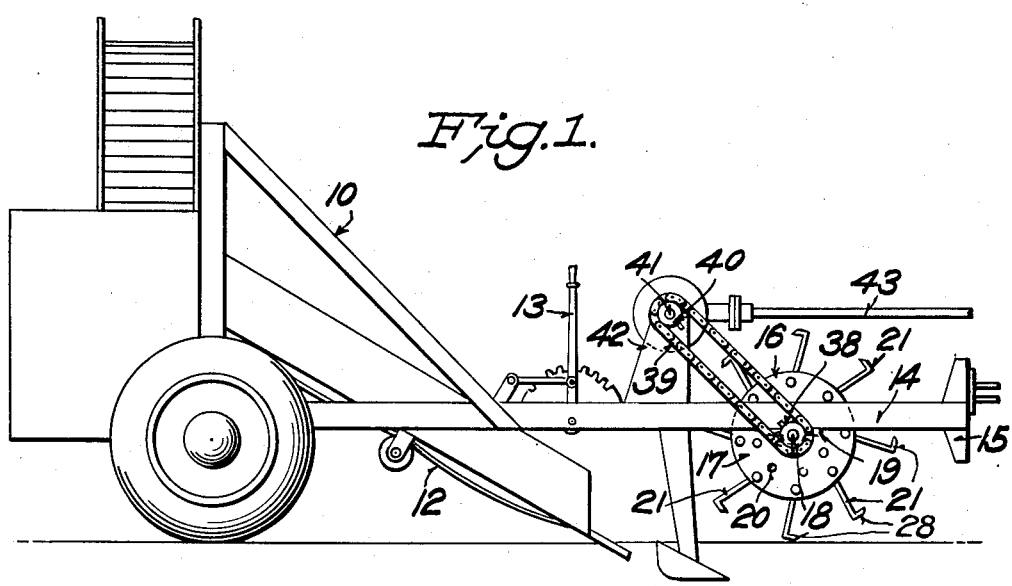
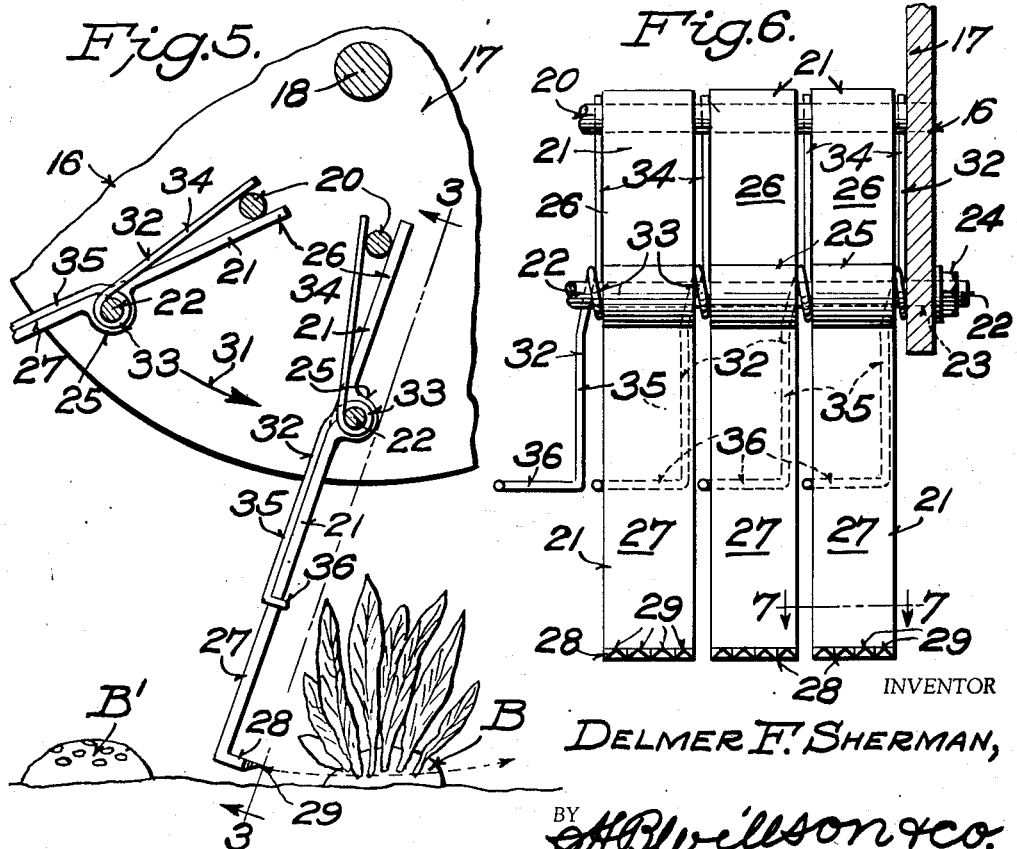
INVENTOR
DELMER F. SHERMAN,
BY H. B. Willson & Co.
ATTORNEYS Feb. 9, 1954
D. F. SHERMAN
2,668,407
ROTARY BEET TOPPER
Filed May 6, 1952
2 Sheets-Sheet 2
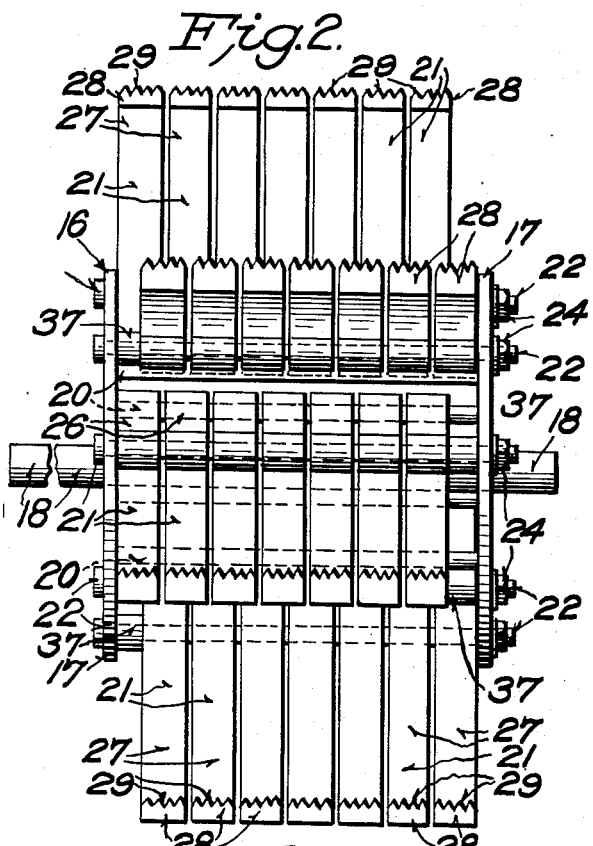
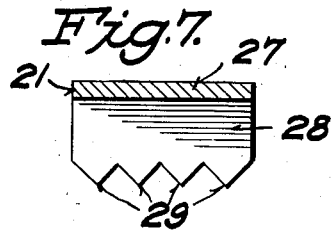
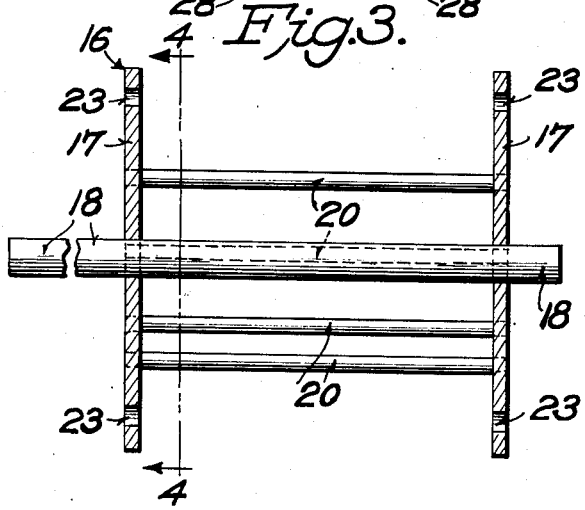
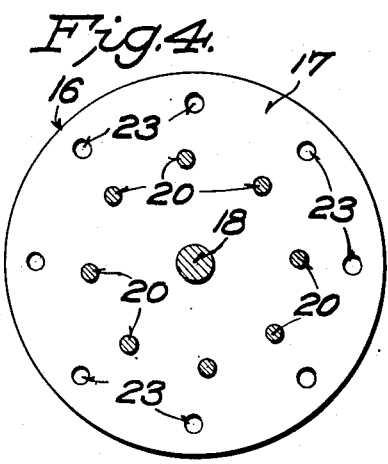
INVENTOR
DELMER F. SHERMAN,
BY A.B. Willson & Co.
ATTORNEY Patented Feb. 9, 1954

2,668,407

UNITED STATES PATENT OFFICE 2,668,407

ROTARY BEET TOPPER

Delmer F. Sherman, New Plymouth, Idaho

Application May 6, 1952, Serial No. 286,255

3 Claims. (Cl. 56—26)

My invention relates to means for removing the leaves and the green top portions of beets and other root crops before they are lifted from the soil.

The principal object of the invention is to provide an improved topper of the rotary type which will remove the leaves and green matter from the tops of the beets by a scraping rather than a cutting action, and hence will waste very little of the sugar bearing portions of the beet crowns. To that end, the invention contemplates a topper having a power driven drum-like member disposed transversely of the row of beets and pushed or pulled longitudinally of the row, the member carrying an annular series of longitudinally extending rows of pivotally mounted spring pressed arms having at their free ends scraper elements which barely scratch the surface of the soil between the beets in a row and which will yield up and down according to the contours of the crowns of the beets so that only the leaves and green matter will be scraped off of the crowns.

Another object of the invention is to provide an improved rotary topper of the above character which may be mounted between a beet digging machine and a tractor that pulls it, and which will be driven from the power take-off of the tractor.

Another object is to provide a topper of this character which is of simple, strong and durable construction and which will be effective in operation.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is an end view of my improved rotary topper showing it mounted on a frame of a tractor pulled beet digging machine, the latter being in side elevation and conventionally illustrated;

Fig. 2 is an enlarged detail diagrammatic view of the rotary drum-like topper member to show the staggered arrangement of the claw elements, the arm-actuating springs being omitted;

Fig. 3 is an enlarged detail longitudinal sectional view of the frame portion of the topper member, the pivoted claw elements being omitted;

Fig. 4 is a detail sectional view of one of the end plates of the rotary member taken on line 4—4 of Fig. 3;

Fig. 5 is an enlarged detail longitudinal section through a portion of the rotary topper;

Fig. 6 is a detail sectional on line 3—3 of Fig. 5; and

Fig. 7 is a detail sectional view taken on line 7—7 of Fig. 6.

Referring more in detail to the drawings, the numeral 10 denotes generally a beet digging machine of any desired form and construction adapted to be pulled over a row of beets by a tractor or other power driven machine (not shown). The digger has suitable digging plows, an endless elevator 12 adjustable by a lever means 13, and other parts mounted on a horizontally disposed rectangular frame that includes suitably connected side bars 14. At the front of the frame is a suitable hitch 15 for connection to the drawbar of a tractor and by means of which the frame may have a limited vertical adjustment.

My improved rotary topper denoted as a whole be the numeral 16, is shown as mounted between the side bars 14 at the front of the frame. It comprises a hollow cylindrical drum-like member composed of two circular heads or plates 17 welded at longitudinally spaced points on a shaft 18 disposed transversely of the frame and journaled for rotation in suitable bearings 19 fastened to the undersides of the bars 14. The heads or disks 17 are also rigidly connected by an annular series of circumferentially spaced rods or bars 20 having their ends welded or otherwise fastened. These rods are spaced inwardly from the peripheries of the heads 17 and also serve as stops to limit the swinging movement in one direction of swingable scraping and peeling arms 21.

The arms 21 are in longitudinally extending rows circumferentially spaced around the peripheral portion of the drum-like member. The arms of each row are pivoted between their ends on a rod or shaft 22 removably connected to the heads 17 adjacent their edges. As shown the pivot rods 22 are in the form of long bolts which pass through opposed openings 23 in the heads arranged in annular series and spaced outwardly from the rods 20, the projecting ends of the pivot rods being screw threaded to receive retaining nuts 24. The arms 21 are shown in the form of flat generally rectangular plates having on one side bearing lugs 25 formed with openings to receive the pivot rods. The transverse lugs 25 are closer to the inner ends 26 of the arms than to the outer ends 27, and those ends 26 are disposed to engage the stop rods 20 to limit the swinging movement of the arms in one direction.

The longer outer ends 27 of the arms project beyond the peripheries of the heads 17 and have angularly bent portions 28 forming claws. The latter have their forward edges serrated to provide a row of teeth 29 which are preferably beveled on their outer sides as shown in Fig. 5. It will be seen upon reference to Figs. 5 and 6 that the claw bars or arms 21 are substantially straight and are disposed so that their outer ends 27 are rearwardly inclined to the direction of movement of the machine and to the direction of movement of the lower portion of the rotary member, the arrow 31 in Fig. 5 indicating the direction of rotation of the latter.

The arms of each row are normally held in such trailing positions with their inner ends against the stop bars 20, by springs 32, one of which is provided for each arm. The springs are made of resilient wire and each consists of a coil 33, an inner end or arm 34 and an outer end or arm 35. Each spring is disposed at one edge of its arm 21 with the rod 20 passing through the coil, the inner end thrusting against the adjacent rod 20, and its outer end provided with a laterally extending hook 36 which engages the outer portion 27 of the arm as shown to urge it in a forward direction. The length of the arms and the mounting of the rotary member above the ground is such that the claw elements 28 will just scratch the surface of the soil between the beets in a row as said elements move in their circular path during forward movement of the machine. The tension of the springs 32 is light so that as the rows of claws 28 reach the rounded top or crown of a beet, the arms will yield and the claws will follow the contour of the beet top and scrape off not only the leaves but a thin layer or peal from the crown. The speed of rotation of the shaft 18 and the rate of forward movement of the machine will be such that a plurality of the rows of the claw elements will act on each beet as the machine advances over the row. Since the arms 21 in each row are slightly spaced apart by the spring coils 33, I preferably position the arms of one row in staggered relation to the arms of a succeeding row so that one row of claws will cover the spaces between claws of a succeeding or following row, as will be understood upon reference to Fig. 2. As shown, in every other row the arms are off-set laterally with respect to the arms of the remaining rows. That may be accomplished by using spacing sleeves 37 on the pivot rods 22 at the ends of the rows of arms. In Fig. 5 I have shown diagrammatically a beet B about to be topped by the claws as the machine moves forwardly, and at B' a beet that has been topped. The claws 28 will be of such size that a plurality of the claws in each row will yield and scrape off the leaves and the green portion of the top of each beet.

It will be understood that the rotary topper may be supported and moved over the row of beets by any suitable means, and that it may be power driven by any suitable means. As shown in Fig. 1 the shaft 18 carries a sprocket wheel 38 connected by a chain 39 to a sprocket wheel 40 on a power driven shaft 41 journalled in bearings on a support 42 on the frame. When the topper is mounted between a tractor and a beet digger which it pulls, I preferably drive the shaft 41 from the power take-off of the tractor. I have conventionally shown a flexible and extensive shaft 43 which is suitably connected at its front to the power take-off and at its rear to the shaft 41.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. Means for scraping the tops from beets standing in a row comprising a power driven and generally cylindrical member rotatable on an axis substantially horizontal and cross-wise of the beet row, a plurality of longitudinal rows of yieldable scraper arms carried by said rotary member, the rows being spaced circumferentially around the member with the arms projecting substantially radially outward of the latter, a scraping blade at the outer ends of said arms projecting substantially at a right angle to the arm and provided with a row of pointed teeth having their outer faces beveled, pivot means mounting the arms of each row for swinging movement on axes extending longitudinally of the member, stop means for limiting the swinging movements of the arms in one direction, and spring means associated with each of said arms to normally hold them in positions substantially radial of said member, whereby when the teeth of a blade engage the top of a beet root the arm of that blade will yield rearwardly and allow the blade to substantially follow the contour of the top of the root.

2. The structure of claim 1 in which said rotary member includes spaced circular end plates fixed to a rotary shaft and connected by an annular series of bars which form said stop means, in which said pivot means includes an annular series of pivot rods between said end plates and disposed radially outward of said bars, and in which said arms have between their ends pivot bearings to turn on said rods, the inner ends of said arms being engageable with said bars.

3. The structure of claim 2 in which each of said spring means includes a coil and two end portions, the coils being disposed on said pivot rods between next adjacent arms, one end portion of each spring thrusting against one of said bars and the other end portion thrusting against the outer portion of the associated arm.

DELMER F. SHERMAN.

References Cited in the file of this patent

UNITED STATES PATENTS

| Number | Name | Date |
|---|---|---|
| 1,846,459 | Romera | Feb. 23, 1932 |
| 2,281,639 | Swan | May 5, 1942 |
| 2,506,054 | Agee et al. | May 2, 1950 |